(12) United States Patent
Wazinski et al.

(10) Patent No.: US 12,284,266 B2
(45) Date of Patent: Apr. 22, 2025

(54) METHOD FOR ENCRYPTING DATA OF A FIELD DEVICE

(71) Applicant: Endress+Hauser Process Solutions AG, Reinach (CH)

(72) Inventors: Peter Wazinski, Freiburg (DE); Ervin Binkert, Möhlin (CH); Sushil Siddesh, Basel (CH)

(73) Assignee: ENDRESS+HAUSER PROCESS SOLUTIONS AG, Reinach (CH)

( * ) Notice: Subject to any disclaimer, the term of this patent is extended or adjusted under 35 U.S.C. 154(b) by 280 days.

(21) Appl. No.: 17/995,496

(22) PCT Filed: Mar. 23, 2021

(86) PCT No.: PCT/EP2021/057451
§ 371 (c)(1),
(2) Date: Oct. 5, 2022

(87) PCT Pub. No.: WO2021/204534
PCT Pub. Date: Oct. 14, 2021

(65) Prior Publication Data
US 2023/0179396 A1 Jun. 8, 2023

(30) Foreign Application Priority Data
Apr. 8, 2020 (DE) ...................... 10 2020 109 896.0

(51) Int. Cl.
*H04L 9/00* (2022.01)
*H04L 9/08* (2006.01)
(52) U.S. Cl.
CPC ............ *H04L 9/008* (2013.01); *H04L 9/0822* (2013.01)

(58) Field of Classification Search
CPC . H04L 9/008; H04L 9/0822; H04L 2209/805; H04L 9/14; H04L 9/0838; H04L 9/00
See application file for complete search history.

(56) References Cited

U.S. PATENT DOCUMENTS

| 11,436,351 B1* | 9/2022 | Abraham ................ H04L 9/008 |
| 2014/0106687 A1* | 4/2014 | Allgaier .............. H02J 7/00308 320/108 |

(Continued)

FOREIGN PATENT DOCUMENTS

| DE | 102018006747 A1 | 8/2019 |
| EP | 3270321 A1 | 1/2018 |
| WO | 2017134269 A1 | 8/2017 |

*Primary Examiner* — Quazi Farooqui
(74) *Attorney, Agent, or Firm* — Brannon Sowers & Cracraft PC

(57) ABSTRACT

A method for encrypting data of a field device includes steps of generating data using the field device, encrypting the data by the field device using a non-homomorphic encryption method using a first key, transmitting the non-homomorphically encrypted data to a first instance, and storing the non-homomorphically encrypted data in the first instance. The method also includes retrieving part of the non-homomorphically encrypted data stored in the first instance by a second instance, and decrypting the retrieved, non-homomorphically encrypted data using the second instance the first key. Further, the data is encrypted by the second instance using a homomorphic encryption method using a second key, wherein the homomorphically encrypted data is transmitted to the first instance or to a third instance and stored.

14 Claims, 1 Drawing Sheet

(56) References Cited

U.S. PATENT DOCUMENTS

2018/0288039 A1   10/2018  Haase et al.
2020/0380141 A1*  12/2020  Wang ..................... G06F 21/64
2021/0176223 A1*   6/2021  Falk ................... H04L 63/0281
2022/0408247 A1*  12/2022  Huang .............. H04W 12/0431

* cited by examiner

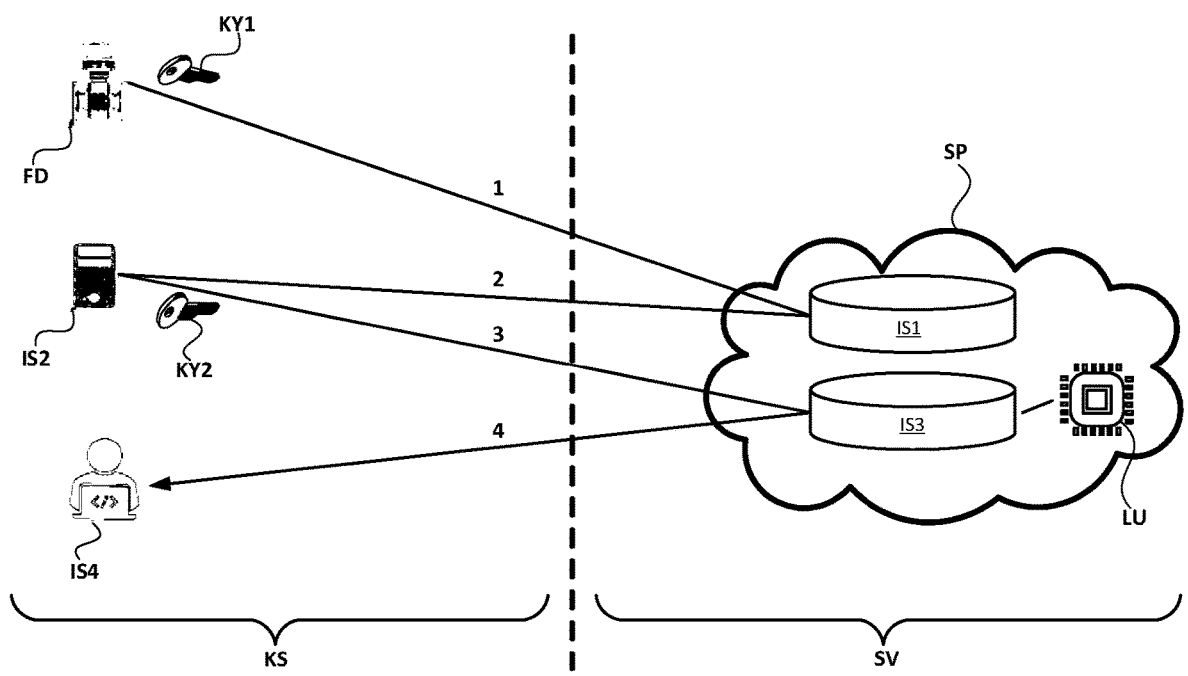

METHOD FOR ENCRYPTING DATA OF A FIELD DEVICE

CROSS-REFERENCE TO RELATED APPLICATIONS

The present application is related to and claims the priority benefit of DPMA Patent Application No. 10 2020 109 896.0, filed on Apr. 8, 2020, and International Patent Application No. PCT/EP2021/057451, filed Mar. 23, 2021, the entire contents of which are incorporated herein by reference.

TECHNICAL FIELD

The invention relates to a method for encrypting data of a field device.

BACKGROUND

Known from the state of the art are field devices, which are used in industrial plants. In process automation technology, as well as in manufacturing automation technology, field devices are often applied. Referred to as field devices are, in principle, all devices, which are applied near to a process and which deliver, or process, process relevant information. Field devices are used for registering and/or influencing process variables. Serving for registering process variables are measuring devices, or sensors. Such are used, for example, for pressure- and temperature measurement, conductivity measurement, flow measurement, pH measurement, fill level measurement, etc. and register the corresponding process variables, pressure, temperature, conductivity, pH value, fill level, flow, etc. Used for influencing process variables are actuators. Such are, for example, pumps or valves, which can influence the flow of a liquid in a measuring tube or pipe or the fill level in a container. Besides the above mentioned measuring devices and actuators, referred to as field devices are also remote I/Os, radio adapters, and, in general, devices, which are arranged at the field level.

A large number of such field devices are produced and sold by the Endress+Hauser group of companies.

In modern industrial plants, field devices are, as a rule, connected via communication networks, such as, for example, fieldbusses (Profibus®, Foundation® Fieldbus, HART®, etc.) with superordinated units. Normally, the superordinated units are control systems, or control units, such as, for example, a PLC (programmable logic controller). The superordinated units serve, among other things, for process control, process visualizing, process monitoring as well as for commissioning of field devices. The measured values registered by field devices, especially by their sensors, are transmitted via the bus system to one or more superordinated units. In addition, also a data transmission from the superordinated unit via the bus system to the field devices is required, especially for configuring and parametering of field devices as well as for operation of actuators.

An edge device is a device, with which data can be transported from field devices into the so-called cloud (a cloud-capable database, which can be contacted via the Internet) in the context of digital services. The data is, for example, condition data of the field devices, by means of which, for example, so-called "Health Scores" of the field devices can be determined, or measured values of the field devices.

This data can, for example, be stored in the cloud, in order that alarm notifications can be issued (for example, per email), in the case, in which a limit value is exceeded, or in order to apply an AI algorithm, for example, for predicting the need for field device maintenance work.

The data transmitted to the cloud should except for the field device owner, or the plant owner, be encrypted for all parties, in order to prevent an undesired escape of information. Even the cloud operator should not be able to decrypt the data.

In order nevertheless to allow processing in the cloud, the data must be encrypted by means of a homomorphic encryption method. Such encrypted data can undergo computation, without the instance performing the computation learning the content of the data undergoing the computation. After completed computation, the data can be decrypted, wherein the result of the computation is retained.

Such homomorphic encryption methods involve complex computer operations, for which sufficient computing power must be present in the hardware. The named edge devices usually have sufficient computing power for these operations.

The computation of homomorphically-encrypted data is applied, for example, currently in the following use-case: It is known to store data of customers in a customer-side database. The customer, however, frequently does not have computer capabilities for processing its data, for example, to evaluate such statistically or predict failures from it. For this, cloud based service platforms are available, which perform such computer operations. The customer would, however, prefer not to transfer its data unencrypted to these platforms, such that the content of the data would be revealed. Similarly, the operator of the service platform would rather not reveal its algorithms. For this reason, the customer transmits its data with homomorphic encryption, in order that the data can undergo computation in the service platform and then be returned to the customer in computation completed form. The customer then decrypts the data and obtains, such as desired, the computation completed, unencrypted content of the data.

In the context of IIoT ("Industrial Internet of Things"), it is also provided that field devices can transmit data to the cloud. Due to special requirements for the field devices, for example, due to an explosion endangered environment, the field devices are frequently operated in a "low power mode". Especially such is also the case, when the field devices are supplied by means of a battery unit with energy required for their operation. For this, the field devices must have a low energy consumption, in order to be able to reliably obtain and transmit measured values over a longer period of time.

Due to the only small available electrical energy resulting from the above reasons, the microcontrollers of the field devices support, allow, only non-homomorphic encryption methods, such as, for example, AES ("Advanced Encryption Standard"). Non-homomorphic encryption methods are not suitable for cloud applications. Only homomorphic encryption methods guarantee a structure retaining encryption of the original data, so that subsequent computations involving non-homomorphic encrypted data is not possible. Computations, for example, on AES-encrypted data would lead to defective results.

SUMMARY

An object of the invention is to provide a method, which allows a complex encrypting of data of field devices with only limited computing power.

The object is achieved by a method for encrypting data of a field device, comprising:

generating data by means of the field device;
   encrypting the data by the field device by means of a non-homomorphic encryption method using a first key;
   transmitting the non-homomorphically encrypted data to a first instance;
   storing the non-homomorphically encrypted data in the first instance;
   retrieving at least a part of the non-homomorphically encrypted data stored in the first instance by a second instance;
   decrypting the retrieved, non-homomorphically encrypted data by means of the second instance using the first key;
   encrypting the data by the second instance by means of a homomorphic encryption method using a second key;
   transmitting the homomorphically encrypted data to the first instance or a third instance; and
   storing the homomorphically encrypted data in the first instance or in the third instance.

An essential idea of the invention is a two-stage encrypting of the data produced by the field device. In a first step, the data are encrypted by means of the field device. In such case, a simple encryption method, which field devices with limited computing power can perform, is sufficient. The data encrypted in such a manner are stored in a first instance. Using the first key used for encrypting the data, the data are retrieved and decrypted by a second instance. For this, the second instance must be told the first key. The field device and the second instance are advantageously arranged customer-side, such that the key transfer can be effected by the customer. Since the customer is the only party permitted to know the decrypted data, the second instance must absolutely be in the possession of the customer, and the decoding can proceed only as authorized by the customer.

Then, the data decrypted by the second instance can be homomorphically encrypted and transmitted to the first instance or to a third instance and stored there in the homomorphically-encrypted form. The second instance has a sufficiently large computing power for this encryption.

In an advantageous, additional development of the method of the invention, it is provided that the method additionally comprises:

executing at least one functionality by the third instance, wherein the execution of the functionality includes a processing of at least a part of the homomorphically encrypted data stored in the first instance or in the third instance to homomorphically encrypted result data;
   retrieving at least a part of the homomorphically encrypted result data by the second instance or by a fourth instance; and
   decrypting the retrieved homomorphically encrypted result data by means of the second instance or the fourth instance using the second key.

The homomorphically encrypted data can due to its special characteristic be processed, or undergo computation, without the processing instance requiring knowledge concerning the unencrypted file content. The result data, which was processed, or underwent computation, can customer-side be decrypted, wherein the processing, or computation, is retained.

In an advantageous embodiment of the method of the invention, it is provided that a cloud based database is used as first instance and wherein a cloud based database is used as third instance.

The terminology, "cloud based", refers in the following to a database or service platform implemented in a server and contactable via the Internet. In the server, applications can be called, which can access the data of the database and process, or utilize, such. These applications can be used by the user via a web interface.

In an advantageous embodiment of the method of the invention, it is provided that the first instance and the third instance are a shared, cloud based database. This means that the instances utilize the same infrastructure and database, yet can differ from one another at the application level.

In an alternative advantageous embodiment of the method of the invention, it is provided that the first instance and the third instance are separate, cloud based databases.

In an advantageous embodiment of the method of the invention, it is provided that a cloud based database is used as second instance and/or wherein a cloud based database is used as fourth instance.

In an advantageous embodiment of the method of the invention, it is provided that a local computer unit is used as second instance and/or wherein a local computer unit is used as fourth instance. Used as computer unit can be, for example, a local PC or a laptop. Alternatively, used as computer unit can be a mobile end device, for example, a smart phone or a tablet, or a suitable wearable—assuming sufficient resources in insofar as computing power, working memory and permanent storage are concerned.

In an advantageous embodiment of the method of the invention, it is provided that the processing of the homomorphically encrypted data to homomorphically encrypted result data comprises at least one step as follows:

applying at least one algorithm, especially an AI-, or machine-learning algorithm;
   accumulating the data;
   subjecting the data to mathematical computation.

For example, applying a machine-learning algorithm includes classifying the data of the field device corresponding to defined criteria. The result of the classification remains after the decrypting.

Mathematical computation includes, for example, comparing measured values of the field device with a minimum- or maximum value. The ratio of a measured value to a minimum- or maximum value is retained even in the case of homomorphically encrypted data, without the second, fourth, instance having to have knowledge of the unencrypted data.

In an advantageous embodiment of the method of the invention, it is provided that a symmetric encryption method is used as non-homomorphic encryption method.

For example, a symmetric encryption method according to at least one of the following standards can be used:

AES ("Advanced Encryption Standard");
   DES ("Data Encryption Standard");
   Triple-DES;
   IDEA ("International Data Encryption Algorithm");
   Blowfish;
   QUISCI ("Quick Stream Cipher");
   Twofish;
   RC2, RC4, RC5, RC6 ("Rivest Cipher");
   Serpent; or
   One-Time-Pad.

In an advantageous embodiment of the method of the invention, it is provided that a partial homomorphic encryption method or a full homomorphic encryption methods is used as homomorphic encryption method.

Homomorphic encryption methods, or cryptosystems, can be classified by their homomorphic characteristics:

Partial homomorphic encryption methods exist, for example, additively homomorphic encryption methods (partially) with the following property:

$$m(a) \oplus m(b) = m(a+b);$$

or as multiplicatively homomorphic encryption methods (partially) with the following property.

$$m(a) \oplus m(b) = m(a \times b).$$

Moreover, full homomorphic encryption methods exist, which possess both additively as well as also multiplicatively homomorphic properties.

In an advantageous embodiment of the method of the invention, it is provided that the data are transmitted between instances (first instance, second instance, in given cases, third instance, in given cases, fourth instance) via the Internet.

Furthermore, the object is achieved by a field device, which is embodied for use in the method of the invention.

Examples of device types of such a field device have already been given in the introductory part of the description.

In a preferred embodiment of the field device of the invention, it is provided that the field device has a first interface and is embodied to transmit the generated data by means of the first interface. The interface can, in such case, be embodied for a wireless data transmission or for a data transmission by wire.

In a preferred embodiment of the field device of the invention, it is provided that the field device has a second interface, wherein the field device is embodied in a communication network by means of the second interface, wherein the field device is embodied to generate data, especially physical measured values of process variables, different from the generated data and to transmit the different data via the communication network to at least one additional participant on the communication network, especially to a control unit.

The communication network is a usual industrial network, for example, an automation fieldbus, via which the field device transmits its data generated in its regular operation.

In an advantageous embodiment of the field device of the invention, it is provided that the field device is supplied via the communication network with its electrical energy required for operation.

In an alternative advantageous embodiment of the field device of the invention, it is provided that the field device has an energy storage unit and wherein the energy storage unit is embodied to supply the field device with its electrical energy required for operation.

In the first variant, the electrical energy transmitted via the communication network is usually small, for example, for Ex-protection reasons.

In the second variant, only a finite energy amount is available in the energy storage unit. Such is, for example, a single-use battery or a rechargeable battery.

Shared by the two variants is that there is usually not sufficient energy available for performing complex computer operations. The method of the invention is especially suited for such field devices.

BRIEF DESCRIPTION OF THE DRAWINGS

The present disclosure will now be explained in greater detail based on the appended drawing. The sole FIGURE of the drawing shows as follows:

FIG. 1 shows an example of an embodiment of the method of the present disclosure.

DETAILED DESCRIPTION

FIG. 1 shows an example of an embodiment of the method of the invention with method steps 1 to 4. Installed customer-side KS in a plant is a field device FD. In the present example, the field device FD is a flow measuring device for ascertaining the flow of a fluid medium through a pipeline. The field device FD can, however, also be any other measuring device for registering physical, measured variables of a process, in which a product is made from a raw or starting material by the application of chemical, physical or biological procedures. Likewise, the field device can be a field-, or process-near, data processing- or network device, for example, a control unit, a gateway or a flow computer.

The field device FD produces data, which is to be transmitted to a first instance IS1. The first instance IS1 in the present case is a cloud based database, which is implemented server side SV in a service platform in a cloud-environment. The service platform SP contains additionally a logic unit LU, which can access data stored in the first instance IS1, or in a third instance IS3 (a database, which is likewise located in the service platform SP) and which can process/execute computations on such data. Alternatively, the logic unit LU is located outside of the service platform SP and can communicate with it.

The service platform serves to process, or to execute computations on, data of the field device FD of the customer and to provide result data to the customer. However, the customer prefers not to reveal its data, because of which the data must be encrypted. The computation/processing cannot be performed on the customer side KS, since the service side SV, for example, the field device manufacturer or the service offeror, prefers not to reveal its computer algorithms to the customer. The data must, consequently, be encrypted in such a manner that such can be processed without knowledge of the exact data content. Such can be assured by a so-called homomorphic encryption.

Since the field device FD has only limited power resources available, only a simple, non-homomorphic encryption is possible. In a first method step 1, the field device encrypts its generated data, for example, condition data, diagnostic data (e.g. Heartbeat), etc., consequently, by means of a symmetric encryption method by means of a first key KY1. This key is a private key, which is known only to the field device FD. The data are transmitted via the Internet to the first instance IS1 in the service platform SP and stored there.

In a second method step 2, the data are download by a customer-side KS arranged, second instance IS2, for example, an adequately powered computer unit, such as a PC, via the Internet. Then, the data are decrypted by means of a public key corresponding to the first key KY1 and possessed by the customer. The customer then has the data unencrypted.

By means of the second instance IS2, the decrypted data are homomorphically encrypted using a second key—again a private key this time known only to the second instance—and transmitted to the third instance IS3 in a third method step 3. There the homomorphically encrypted data is stored. Its content is not perceivable service side SV.

The logic unit LU can now access the homomorphically encrypted data and process, or do computations on, such. For example, the logic unit LU executes an algorithm, which with the help of available machine learning-, or AI methods, diagnoses a need for maintaining a field device FD, in given cases, with the setting of a latest recommended maintenance deadline. The processed/computationally worked data are then stored as result data in the third instance IS3.

In a fourth method step 4, the result data are downloaded via the Internet by a customer-side KS arranged, fourth instance IS2, for example, a PC or a mobile end device. Then, the result data are decrypted by means of a public key corresponding to the second key KY2 and held by the customer. The customer now has the result data in unencrypted form, wherein the result of the computation, or processing, is retained.

The method of the invention allows processing, executing computations on, the data of the power weak field device FD service side SV, without requiring that the content of the data be revealed service side SV.

The method of the invention is amenable to many forms of embodiment:

On the one hand, the exact embodiments of the individual instances IS1, IS2, IS3, IS4 can vary. For example, the first instance IS1 and/or the third instance IS3 can also be local computer units. And the second instance IS2 and/or the fourth instance IS4 can alternatively be mobile end devices, for example, smartphones or tablets.

On the other hand, the first instance IS1 and the third instance IS3 and/or the second instance IS2 and the fourth instance IS4 can be implemented in a shared device or in a shared database.

The invention claimed is:

1. A method for encrypting data of a field device, comprising:
   generating data using the field device;
   encrypting the data by the field device using a non-homomorphic encryption method using a first key;
   transmitting the non-homomorphically encrypted data to a first instance;
   storing the non-homomorphically encrypted data in the first instance;
   retrieving at least a part of the non-homomorphically encrypted data stored in the first instance by a second instance;
   decrypting the retrieved, non-homomorphically encrypted data using the second instance using the first key;
   encrypting the data by the second instance by means of a homomorphic encryption method using a second key;
   transmitting the homomorphically encrypted data to the first instance or a third instance;
   storing the homomorphically encrypted data in the first instance or in the third instance; and
   supplying the field device with electrical energy required for operation from at least one of, an energy storage unit included as a part of the field device or a communication network wherein the field device is embedded.

2. The method of claim 1, further comprising:
   executing at least one functionality by the third instance, wherein the execution of the functionality includes a processing of at least a part of the homomorphically encrypted data stored in the first instance or in the third instance to homomorphically encrypted result data;
   retrieving at least a part of the homomorphically encrypted result data by the second instance or by a fourth instance; and
   decrypting the retrieved homomorphically encrypted result data using the second instance or the fourth instance using the second key.

3. The method of claim 1, wherein each of the first instance and the third instance includes a cloud based database.

4. The method of claim 3, wherein the first instance and the third instance are a shared cloud based database.

5. The method of claim 3, wherein the first instance and the third instance are separate cloud based databases.

6. The method of claim 1, where each of the second instance and the fourth instance includes a cloud based database.

7. The method of claim 6, wherein each of the second instance and the fourth instance includes a local computer unit.

8. The method of claim 1, wherein the processing of the homomorphically encrypted data to homomorphically encrypted result data comprises at least one of the following steps:
   applying at least one AI- or machine-learning algorithm;
   accumulating the data;
   subjecting the data to mathematical computation.

9. The method of claim 1, wherein a symmetric encryption method is used as the non-homomorphic encryption method.

10. The method of claim 1, wherein a partial homomorphic encryption method or a full homomorphic encryption method is used as the homomorphic encryption method.

11. The method of claim 1, wherein the data is transmitted between instances via the Internet.

12. A field device, which is embodied for use in a method for encrypting the field device, including the following steps:
   generating data using the field device;
   encrypting the data by the field device using a non-homomorphic encryption method using a first key;
   transmitting the non-homomorphically encrypted data to a first instance;
   storing the non-homomorphically encrypted data in the first instance;
   retrieving at least a part of the non-homomorphically encrypted data stored in the first instance by a second instance;
   decrypting the retrieved, non-homomorphically encrypted data using the second instance using the first key;
   encrypting the data by the second instance by means of a homomorphic encryption method using a second key;
   transmitting the homomorphically encrypted data to the first instance or a third instance;
   storing the homomorphically encrypted data in the first instance or in the third instance; and
   supplying the field device with electrical energy required for operation from at least one of, an energy storage unit included as a part of the field device or a communication network wherein the field device is embedded.

13. The field device of claim 12, wherein the field device has a first interface and is embodied to transmit the generated data using the first interface.

14. The field device of claim 12, wherein the field device has a second interface, wherein the field device is embedded in the communication network using the second interface, and wherein the field device is embodied to generate data different from the generated data and to transmit the different data via the communication network to at least one additional participant on the communication network.

* * * * *